United States Patent
Göbel et al.

(10) Patent No.: US 8,992,375 B2
(45) Date of Patent: Mar. 31, 2015

(54) BICYCLE TRANSMISSION, PARTICULARLY IN FORM OF A MULTI-SPEED GEAR HUB

(71) Applicant: SRAM Deutschland GmbH, Schweinfurt (DE)

(72) Inventors: Joachim Göbel, Prosselsheim (DE); Wolfram Frank, Bamberg (DE)

(73) Assignee: SRAM, LLC, Chicago, IL (US)

( * ) Notice: Subject to any disclaimer, the term of this patent is extended or adjusted under 35 U.S.C. 154(b) by 110 days.

(21) Appl. No.: 13/746,092

(22) Filed: Jan. 21, 2013

(65) Prior Publication Data
US 2013/0190128 A1 Jul. 25, 2013

(30) Foreign Application Priority Data
Jan. 20, 2012 (DE) .......................... 10 2012 200 829

(51) Int. Cl.
*F16H 3/44* (2006.01)
*F16H 57/08* (2006.01)
*B62M 11/16* (2006.01)
*B62M 11/18* (2006.01)

(52) U.S. Cl.
CPC ................. *F16H 3/44* (2013.01); *B62M 11/16* (2013.01); *B62M 11/18* (2013.01)
USPC .......................................... 475/292; 475/349

(58) Field of Classification Search
USPC .................................. 475/3, 12, 270, 292, 349
See application file for complete search history.

(56) References Cited

U.S. PATENT DOCUMENTS

| 3,432,013 | A | | 3/1969 | Matsumoto |
| 3,608,683 | A | | 9/1971 | Fujisawa |
| 4,461,375 | A | * | 7/1984 | Brown ................... 192/45.018 |
| 5,242,335 | A | * | 9/1993 | Kutter .............................. 475/4 |
| 5,273,500 | A | | 12/1993 | Nagano |
| 5,540,456 | A | | 7/1996 | Meier-Burkamp et al. |
| 8,052,568 | B2 | * | 11/2011 | Hino ............................. 475/297 |
| 2011/0130242 | A1 | | 6/2011 | Gobel |
| 2011/0174565 | A1 | | 7/2011 | Rochat |

FOREIGN PATENT DOCUMENTS

| DE | 3819065 | 1/1994 |
| DE | 4229023 | 2/1995 |
| DE | 4402344 | 3/1995 |
| DE | 4142867 | 7/1997 |
| EP | 0383350 | 6/1995 |
| EP | 0679970 | 6/1998 |
| EP | 2112062 | 10/2009 |
| EP | 2327612 | 6/2011 |
| EP | 2327617 | 3/2013 |
| GB | 2207966 | 2/1989 |
| GB | 2270129 | 5/1994 |

* cited by examiner

*Primary Examiner* — Edwin A Young
(74) *Attorney, Agent, or Firm* — Milan Milosevic; Lisa Serdynski

(57) ABSTRACT

The invention relates to a drive pawl within a bicycle transmission, wherein at least one torque transmission path extends from an input side to an output side across the same, and that has allocated thereto, relative to a first component supporting said pawl, a rotatable ring part, which interacts with the pawl for the alternate activation and deactivation of the pawl.

28 Claims, 9 Drawing Sheets

BICYCLE TRANSMISSION, PARTICULARLY IN FORM OF A MULTI-SPEED GEAR HUB

BACKGROUND OF THE INVENTION

Bicycle transmissions that are configured as multi-speed gear hubs are known in the art in a variety of embodiments. Reference is presently being made to the specifications U.S. Pat. No. 3,432,013; DE 38 19 065 A1 (and the corresponding document GB 2 207 966 A); EP 0 383 350 A2; U.S. Pat. No. 3,608,683; as well as DE 41 42 867 A1.

EP 2 327 612 A2 discloses a multi-speed gear hub for bicycles that would correspond to a bicycle transmission of the type as mentioned below if a driver freewheeling clutch were implemented between a driver and an ring gear of a first gear level as a pawl freewheeling clutch, which is considered as particularly expedient in practice.

In a bicycle transmission of this kind, a ring part of the bicycle transmission is frequently allocated to the pawl, which is variable relative to the first component, and which interacts with the pawl such that in a first position of the ring part relative to the first component, which is referred to below as an activation position, the pawl is in the engagement position or at least biased in the direction of being in the engagement position; and that, based on an adjustment of the ring part from the activation position into a second position, which is referred to below as the deactivation position, the pawl is removable relative to the first component from the engagement position.

Correspondingly, U.S. Pat. No. 3,432,013 discloses in this sense a control sleeve as a third component that removes, during the brake action, two drive pawls against restoring forces of a spring from the engagement position, whereby now it is possible to transmit via the brake pawls torque to the brake means without the result of a strain on the transmission causing a so-called "brake lock" that must absolutely be avoided; the brake means herein is engaged and can no longer be disengaged because the forward pedaling action that is necessary for disengaging the brake means is prevented by the drive pawls that are in the engagement position and contact the allocated engagement formation. DE 38 19 065 A1 (and/or the corresponding GB 2 207 966 A), EP 0 383 350 A2 and DE 41 42 867 A1 disclose known prior-art configurations of this kind. Similarly U.S. Pat. No. 3,608,683 also specifies a relevant construction.

The prior art describes implementations of freewheeling and/or one-way clutches using roller elements that are clamped between an engagement surface of a first component and a cam surface of a second component in order to transmit torque, as implemented, for example, according to EP 0 679 970 B2.

DE 44 02 344 C1 discloses removing a pawl from an engagement position by means of a cam element against the force of a biased spring holding the pawl in the direction of the engagement position. In the known solution according to DE 44 02 344 C1, the pawl serves to couple a ring body to the hub axle in a non-rotatable manner; and the cam element releasing the pawl is constituted of a control slide that is coaxially displaceable relative to the hub axle.

Specification DE 42 29 023 C2 discloses a solution with two pawl sets that can be activated and deactivated interactively by means of an axially displaceable control disc, which holds the pawls of a first pawl set in a first axial position in the engagement position thereof and releases the pawls of a second pawl set from the engagement position, holding the pawls of the second pawl set in their engagement position, in a second axial position, allowing the removal of the pawls of the first pawl set from the engagement position thereof. The pawls, respectively, are biased by a pawl spring in the direction of a release position in which the pawls do not engage with an engagement formation allocated to them. Forces that are generated during the transmission of torque have an effect in the sense of a controlled removal of the pawls. The control disc is axially variable due to shifting forces, by means of sliding blocks introduced from the outside into the multi-speed hub in order to shift between at least two gears of the multi-speed hub by means of the aforementioned interactive activation and deactivation of the two pawl sets.

EP 2 112 062 A1 discloses the use of a so-called "negatively preloaded pawl" in a planetary gear mechanism of a bicycle transmission that is supported by a stationary carrier element serving for optionally releasing or, in the alternative, blocking a sun gear as well as providing a freewheeling function for the blocked sun gear. The spring-preloaded pawl can be shifted between two states by a cam element that is able to rotate across a small angle of rotation relative to the carrier element. In a first state, the pawl allows for any rotation of the sun gear relative to the carrier element, meaning rotation in both possible directions of rotation. In a second state, the pawl prevents the sun gear from turning in a first direction of rotation relative to the carrier part but allows a rotation of the sun gear in a second direction relative to the carrier part that is opposite to the first direction of rotation. To implement these functions, the pawl is pivotable, on the one hand, depending on the position of the cam element around a first pivot axis into a position corresponding to the first state, and, on the other hand, it is pivotable around a second pivot axis in order to implement a freewheeling function corresponding to the second state.

BRIEF SUMMARY OF THE INVENTION

An object of the present invention includes a bicycle transmission that includes the aforementioned third component (e.g., a ring part) of the kind as indicated above from which the at least one drive pawl, across which extends the at least one torque transmission path that connects the input side (e.g., driver) to the output side (e.g., hub shell), is removable from the engagement position with a high level of operational reliability based on an input torque introduced at the input side for transmission via the at least one other torque transmission path and without any occurrence of strain in the transmission and/or, in the context of a brake action, a so-called "brake lock.".

To achieve this object, it is proposed for the ring part to include a cam surface that interacts with a cam follower portion of the pawl in such a way that with a movement by the ring part from the activation position in the deactivation position, the cam surface thus moves relative to the cam follower portion such that the removal action of the pawl from the engagement position is allowed, and that, with a movement by the ring part from the deactivation position in the activation position, the pawl is forcibly moved, due to the interaction by the cam surface and the cam follower portion, in order to be in the engagement position when the ring part is in the activation position, or to be at least biased in the direction of being in the engagement position.

It is considered, in particular, that the ring part is supported on the driver for a joint rotation and that the ring part is rotatable relative to the driver, preferably across a delimited area of an angle of rotation that is defined, for example, by means of stops. The shifting mechanism of the bicycle transmission is then able to function completely by rotation, which is advantageous. Complex mechanisms allowing, for example, for axial deflection can thus be omitted.

It is envisioned for the ring part to be biased by a spring arrangement in the direction relative to the activation position. Based on this proposed improvement, it is advantageous and easily achievable that following the torque transmission the pawl returns to the engagement position thereof, such that it is possible to transmit via the torque transmission path, extending across the pawl, drive torque to the input side. However, it is also easily conceivable to provide for the ring part to be able of being moved to the activation position based on an input torque that is introduced via the torque transmission path extending at the input side, if necessary, supported by a spring arrangement that biases the ring part in the direction of the activation position. A spring arrangement is not absolutely necessary, however, provided the third component is movable from the deactivation position into the activation position based on the input torque that is introduced on the input side (e.g., driver).

By way of an improvement of the pawl it is proposed that, in the activation position of the ring part, the pawl is pivotable around a first pivot axis that is defined by the cam follower portion, and that the pawl is pivotable, when the ring part is in deactivation position, around a second pivot axis that is defined by a pawl portion disposed at a distance relative to the cam follower portion such as, for example, by a pawl end portion that is opposite to an engagement portion serving for the engagement with the engagement formation (e.g., inside facing teeth or catch teeth). The pawl therein can be pivotable around the second pivot axis when the ring part is in the deactivation position; and the pawl can be pivotable around the first pivot axis, when the ring part is in the activation position. It is expedient to provide a spring arrangement that is allocated to the pawl acting thereupon; and the spring arrangement biases the pawl in the activation position of the ring part in the sense of a pivoting action around the first pivot axis in the direction of the engagement position, and the spring arrangement biases the pawl in the deactivation position of the ring part in the sense of a pivoting action around the second pivot axis in the direction of a position of non-engagement with the allocated engagement formation.

Advantageously, the pawl can be shifted by means of the ring part between a functionality of a freewheeling pawl that is biased for being in the engagement position and a functionality wherein the pawl is biased in the direction of a position of non-engagement with the allocated engagement formation.

The general idea of the invention envisions a spring arrangement that acts upon the pawl and biases the pawl at least in the deactivation position of the ring part in the direction of being in a freewheeling position in which the pawl does not engage with the engagement formation.

Furthermore, it is generally envisioned to provide a spring arrangement that acts upon the pawl and biases the same at least in the activation position of the ring part for being in the engagement position.

Using the pawl according to the invention, it is possible to implement with greatly advantageous results different important function of a bicycle transmission.

Correspondingly, it is possible to envision that, at least for a minimum of a certain instantaneous gear state, in which the ring part is in the activation position, the pawl is movable into an overdrive position, consequent to torque transmission via at least one other torque transmission path (hereafter also referred to as other torque transmission path of the first kind), based on the interaction with the allocated engagement formation, in which the pawl does not engage in a rotatably coupled manner in the engagement formation in order to allow for a relative rotating of the two components at least in one relative direction of rotation occurring in connection with one of the torque transmissions via said other torque transmission path. This way, it is possible to reliably avoid transmission strains.

The other torque transmission path (presently also referred to as other torque transmission path of the first kind) can connect the driver with the brake in order to provide the brake torque, which is dependent on the input brake torque, for braking the driven wheel via the hub shell. To this end, the pawl can be advantageously removable from the engagement position for the torque transmission via the other torque transmission path of the first kind based on an input brake torque that is introduced on the input side.

It is also possible and proposed that the ring part is movable from the activation position to the deactivation position based on the input brake torque and/or that the ring part is movable, based on an input drive torque that is introduced on the input side, from the deactivation position into the activation position (as mentioned previously).

Furthermore it is possible to envision that the pawl is removable from the engagement position based on a torque that is introduced on the output side of the bicycle transmission and corresponds to a reverse-push operation of the bicycle. The ring part therein can be moved from the activation position into the deactivation position based on a torque that is introduced on the output side of the bicycle transmission, corresponding to reverse-push operation of the bicycle.

An especially high level of operational reliability is achieved if, at least in the deactivation position of the ring part, an interaction of the pawl with the allocated engagement formation is in effect a) due to torque transmission via the other torque transmission path (presently also referred to as the other torque transmission path of the first kind); and/or b) due to the introduction of torque on the output side into the bicycle transmission corresponding to a reverse-push operation of the bicycle acting upon the pawl in the sense of deflecting the pawl from the engagement position.

It is possible to envision that all torque transmission paths connecting the input side with the output side extend across the at least one pawl according to the invention, whereby the pawl is torque-transmitting in the context of all gear speeds in order to provide the output drive torque on the basis of the input drive torque. However, it is entirely conceivable that for one or a plurality of gear speeds, the torque is transmitted from the input side to the output side via a torque transmission path that does not extend across the pawl according to the invention. To this end, the pawl can be used to implement a one-way clutch or a freewheeling mechanism. In this context, it is considered that, at least in the activation position of the ring part, the pawl is movable, due to torque transmission via another torque transmission path (hereafter also referred to as torque transmission path of the second kind), based on an interaction with the allocated engagement formation (also known as catch teeth) in the overdrive position, in which the pawl does not engage in the engagement formation in a rotary-coupling manner, in order to allow for a relative rotating of the two components at least in one relative direction of rotation that occurs with the torque transmission via this other torque transmission path.

As noted previously, at least one other torque transmission path and/or the other torque transmission path (presently also referred to as other torque transmission path of the second kind) connecting the input side with the output side can be used for providing the output drive torque to the output side based on the input drive torque. The pawl for the torque transmission therein can be removable from the engagement position by means of the/an interaction with the engagement formation via the other torque transmission path of the second kind based on an input drive torque that is introduced on the input side.

Regarding the implementation of the brake function, it is considered, first and foremost, that a torque transmission path connecting the output side with the brake (presently also referred to as other torque transmission path of the first kind) extends at least across a further pawl (e.g., a brake pawl), which can be brought into an engagement position for the torque transmission via this torque transmission path that allows for torque transmission between a fourth component (e.g., a planetary gear carrier) of the bicycle transmission, carrying the pawl and being rotatably supported, and an allocated rotatably supported fifth component (e.g., ring part) of the bicycle transmission in order to create a rotatably guided connection by engagement with the allocated engagement formation of the fifth component. The further pawl therein can be biased in the direction of being in the engagement position by means of a spring arrangement.

Based on the at least one pawl according to the invention, across which the torque transmission path connecting the input side to the output side extends and which can thus also be referred to as a "drive pawl," it is possible to omit any active disengagement of the further pawl (which can also be referred to as a "brake pawl"), whereby the risk of the one or plurality of brake pawls getting caught while in the non-engagement state, such as, for example, due to stuck-on grease, is avoided. The brake function is thus always ensured. Instead, to implement brake action, the drive pawl according to the invention across which the torque transmission path connecting the input side to the output side extends, is removed from the engagement position such that in the event of a malfunction, when the pawl does not return to the engagement position thereof, for example, due to stuck-on grease, the bicycle can merely not be powered. This is more acceptable because, when this occurs, the bike rider notices the malfunction immediately and the all-important brake function is not in jeopardy because the at least one brake pawl (typically a plurality of brake pawls) is always available in an un-operated state for the transmission of brake torque.

The further pawl (brake pawl) can be movable in an over-drive position, due to torque transmission via the torque transmission path extending across the at least one, pawl, and connecting the input side with the output side, based on the interaction with the allocated engagement formation in which the pawl does not engage in a rotatably-coupling manner in the engagement formation, in order to allow for a relative rotating of the fourth and fifth components at least in one relative direction occurring with the torque transmission via said torque transmission path that connects the input side with the output side. If there exists at least one other torque transmission path of the second kind connecting the input side with the output side, it can apply correspondingly for torque transmission via this other torque transmission path.

In principle, there are many possibilities for a detailed configuration of the bicycle transmission. As noted previously, a typical bicycle transmission is configured as a multi-speed gear hub having a driver that is rotatably supported on a hub axle, which serves as input side, and a hub shell that is rotatably supported on the hub axle, which serves as output side. The driver therein can advantageously constitute the first component; and a gear element of the gear arrangement can constitute the second component. It is proposed therein concretely that a ring gear of a planetary gear mechanism of the gear arrangement be used to constitute the second component.

Furthermore, it is proposed for a ring part to be disposed at least proportionally radially within the driver, and rotatably supported on the hub axle by means of the driver and rotatable in relation to the driver at least across an area of an angle of rotation that is delimited by the activation position and the deactivation position, preferably configured as a ring part, if so desired fulfilling a rotatable-guiding function with regard to at least one direction of rotation, and therefore constituting, if necessary, a catch. Envisioned therein can be at least one compression spring disposed between a support element of the driver and a support element of the part (or the ring part or the catch, respectively) that biases the part relative to the driver in the direction of the activation position. Expediently, the activation position can also be defined by a stop disposed between the driver and the component.

Under consideration is, furthermore, that said part and a gear element of the gear arrangement constitute the fourth and the fifth components, respectively. In this case, the part can, on the one hand, constitute the fourth or fifth component, respectively, and, on the other hand, the third component. Expediently, it is possible for a planetary gear carrier of a/of the planetary gear of the gear arrangement to constitute the fourth or fifth components, respectively. Primarily considered is the option of the planetary gear carrier constituting the fourth component and, correspondingly, for the part to constitute the fifth component and simultaneously the third component. The torque transmission from the input side to the brake means can thus be expediently achieved via the planetary gear carrier, if so desired via a plurality of planetary gear carriers coupled to each other, if so desired via a plurality of planetary gears combined in a single part, or a plurality of sequentially arranged planetary gears of the gear arrangement. The multi-speed gear hub can be advantageously configured such as known in the art from EP 2 327 617 A2.

Preferably, it is envisioned that a rotary play is embodied between the driver constituting the first component and the part constituting the third component such that, during a reverse rotation of the driver, the pawl, across which there extends the at least one torque transmission path connecting the input side with the output side, is removed or removable from the engagement position consequent to a relative rotating of the part in the direction of the deactivation position, at the latest upon the beginning of a reverse rotation of the ring gear constituting the second component. The removal of the pawl from the engagement position can be achieved by means of a spring arrangement that is allocated to the pawl acting upon the same, or by the effect and/or contributing effect of the engagement formation of the ring gear, which can advantageously include corresponding deflective slanted surfaces, respectively.

BRIEF DESCRIPTION OF THE SEVERAL VIEWS OF THE DRAWINGS

The invention is illustrated by way of example below based on the attached figures.

DETAILED DESCRIPTION OF THE INVENTION

Figure 1:
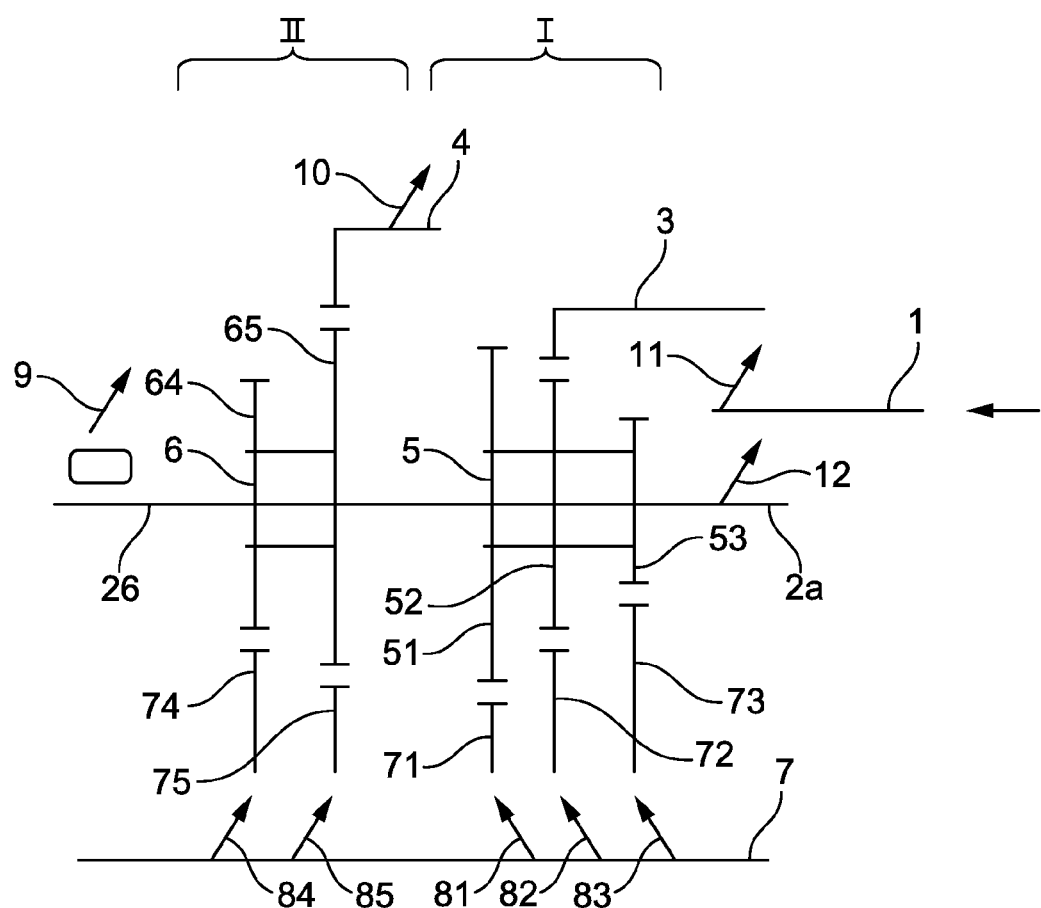
FIG. 1 is the basic transmission schematic of a preferred embodied example according to the invention having nine gear levels.

FIG. 1 shows a representation in principle of an embodied example of a gear hub in the context of which the proposed invention and improvement can be advantageously applied. The figure depicts a schematic representation of half of a gear hub above the hub axle 7, including hub axle 7, but without the hub shell.

The drive movement is introduced at the driver 1, wherein a rotary catching occurs during forward rotary movement by means of a driver freewheeling clutch 11 to the entry of a first gear level I on a first ring gear 3. An embodiment of the invention of the driver freewheeling clutch capturing a preferred embodiment is described below in reference to the remainder of the figures.

A first planetary gear carrier 2a supports first stage planetary gears 5 and a second planetary gear carrier 2b, which is coupled (or can be coupled) to the first planetary gear carrier by a joint rotation, and supports second stage planetary gears 6. The first stage planetary gears 5 include a first planetary gear 51, a second planetary gear 52 and a third planetary gear 53, respectively, that are connected with each other in a non-rotatable manner and that have allocated thereto a first sun gear 71, a second sun gear 72 and a third sun gear 73, respectively. The sun gears can be rendered non-rotatable relative to the hub axle 7 by means of sun gear clutches 81, 82, 83, which are allocated thereto and constituted as freewheeling clutches. Thus there result corresponding speed ratios of a first gear level I. Due to the fact that during the first gear level I the first ring gear 3 is powered in a forward direction of rotation, the sun gear couplings 81, 82, 83 have to support the sun gears relative to a rotation in the reverse direction.

The sun gear clutches 81 and 82 are controllable (shiftable). The freewheeling clutch 83 on the largest sun gear 73 does not have to be shifted because it comes with automatic overdrive, when a sun gear clutch 81, 82 of a smaller sun gear 71, 72 renders said sun gear 71, 72 non-rotatable in relation to the hub axle 7. In the first gear level I, which acts as an underdrive gear, no speed ratio of 1:1 is used such that a gear level must always be in effect, and whereby, correspondingly, at least one sun gear must be non-rotatable relative to the hub axle in all shifting states; in the construction presently shown, this is the largest sun gear 81.

A second gear level II acting as an overdrive gear level having the planetary gear carrier 2b, the second level planetary gears 6, sun gears 74, 75 and a second ring gear 4 is configured in the same manner as the first gear level. Adjustment of a speed ratio occurs by means of controllable (shiftable) sun gear clutches 84, 85, which are also configured as freewheeling, rendering the respective sun gear 74, 75 non-rotatable in relation to a forward direction of rotation relative to the hub axle 7. The output relative to the hub shell occurs on the second ring gear 4 by means of an ring gear freewheel 10, when one of the sun gears 74, 75 is rendered non-rotatable relative to the hub axle 7. If both sun gears are able to rotate freely, the output occurs on the planetary gear carrier 2b that includes a planetary gear carrier freewheel 9 toward the hub shell, which is presently not shown.

The planetary, gear carriers 2a and 2b can be constituted by a one-piece planetary gear carrier 2a, 2b, as pointed to in FIG. 1. The planetary gear carrier 2a, 2b serves for transmitting the reverse rotary motion to a coaster brake, which is presently not shown. The activation of the backpedal is also introduced, like the forward drive rotary motion, at the driver 1. A reverse-coupling brake freewheeling mechanism 12 is disposed between driver 1 and planetary gear carrier 2a. In order to prevent the first ring gear 3, which then runs faster in reverse than the planetary gear carrier, from causing a blocking of the transmission, the driver freewheeling clutch 11 is turned off during a reverse rotation. During the brake action, the brake freewheel mechanism 12 takes the planetary gear carriers 2a, 2b along in a reverse direction of rotation, thereby triggering the coaster brake. The coaster brake can be constituted as known in the art such as, for example, as a roller brake, wherein the rollers move brake shoes radially toward the outside along ascending sections; or as a cone brake, in which an axially moved cone spreads the brake shoes apart radially to the outside. Brake activation occurs with a direct transfer of the actuation movement at the driver, independent of the selected overall speed ratio for the forward rotation.

The principle-type drawing as shown in FIG. 1 represents a 9-speed configuration with coaster brake. The maximum of nine speeds in this configuration results from the multiplication of three gear level speed ratios of the underdrive gear level I with the three possible states of the overdrive gear level II. The three shifting states of gear level I are i) defined first sun gear 71, ii) defined second sun gear 72 and iii) defined sun gear 73; and the three shifting states of gear level II are i) defined forth sun gear 74, ii) defined fifth sun gear 75, and iii) both sun gear 74 as well as sun gear 75 are not defined.

Regarding any further details to explain the basic construction as depicted in FIG. 1, reference is presently being made to EP 2 327 617 A2, which is from where FIG. 1 originates. The applicant has described an actuation mechanism, working purely by rotary means, that is suitable for controlling the sun gear clutches and by which a longitudinal motion of an inner cable can be converted to a rotary motion of an actuation sleeve, and convertible to the inside of the gear hub for achieving an effect upon the sun gear pawls of the controllable sun gear clutches in earlier applications, namely in German patent application DE 10 2010 049 438.0 filed on Oct. 23, 2010, Dutch patent application NL 2007564 filed on Oct. 11, 2011 and in the U.S. application U.S. Ser. No. 13/279,446 filed on Oct. 24, 2011. However, it is also possible to use other actuation mechanisms from the prior art for triggering the shiftable sun gear clutches, which are known to a person skilled in the art.

In the shown basic construction, all "torque transmission paths" providing drive torque to the hub shell extend between the driver 1 serving as "input side" and the hub shell serving as "output side" and across the driver freewheeling clutch 11. Furthermore, in the shown basic construction, "another torque transmission path" extends from the driver 1 via brake freewheel 12 and planetary gear carrier 2a, 2b to the coaster brake.

To provide, in addition a speed ratio of 1:1 it would be possible to modify the construction such that a further "other torque transmission path" can be provided with the drive torque at the hub shell, and from which driver 1 extends via a shiftable second driver freewheeling clutch extends to the planetary gear carrier 2a, 2b.

Further to be noted is the fact that other constructions indeed exist and are conceivable for implementing the inventive idea and improvements thereto, that provide for the torque transmission via a plurality of different "torque transmission paths" to the hub shell and/or via at least one further "torque transmission path" to the coaster brake in a completely different manner.

Figure 2:
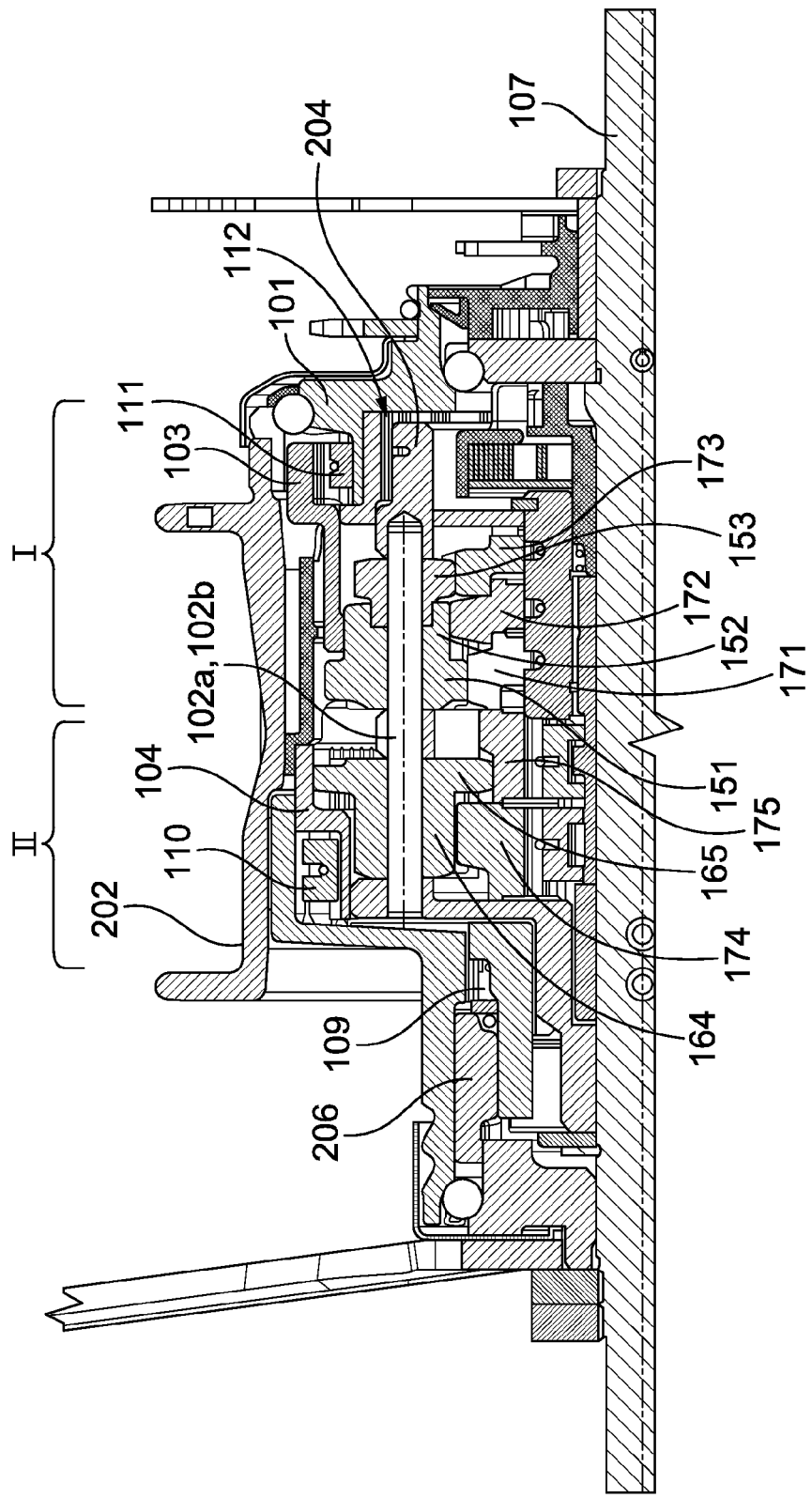
FIG. 2 is a longitudinal section through the central axis of the hub axle of an example of the multi-speed gear hub that embodies the transmission schematic.

FIG. 2 shows a concrete embodiment of a bicycle gear hub according to the invention that corresponds to the transmission schematic as set forth in FIG. 1 whereby the inventive idea is implemented in connection with the driver freewheeling clutch 11 of the transmission schematic. Subsequently, the same reference numerals as used in FIG. 1 and in the previous explanation of said transmission schematic will continue to be used below for corresponding and/or analogous components, merely increased by 100. The complete construction according to FIG. 2 is only outlined insofar, using the driver freewheel according to the invention, as necessary for an explanation of the invention. This is the reason why not all components that are identified by reference numerals in FIG. 1 are also identified by corresponding reference numerals in FIG. 2. Any components mentioned below that are not depicted in FIG. 1 and/or not identified by reference numerals, shall be given reference numerals above 200. Correspondingly, a hub shell is designated by numeral 202. According to the transmission schematic in FIG. 1, the hub shell 202 includes two planetary gear levels of which gear level I includes ring gear 103, planetary gears 151, 152 and 153 as well as sun gears 171, 172 and 173; and gear level II includes planetary gears 164 and 165 as well as sun gears 174 and 175. All planetary gears are supported by a joint planetary carrier 102a, 102b. Sun gear clutches are allocated to the sun gears, as explained in reference to the transmission schematic as shown in FIG. 1.

The driver 101 carries pawls that implement, in conjunction with toothed-type catching formations (also referred to as catch teeth or an engagement formation) on an inner circumference of the ring gear 103, a driver freewheeling clutch 111 and shall also be referred to hereafter as drive pawls. Below, the drive pawls as well as the driver freewheeling clutch are referred to by reference numeral 111. Further pawls that are not visible in FIG. 2 are supported by a portion 204 of the planetary gear carrier 102a, 102b that is radially disposed within pawls 111 constituting a freewheel brake 112. The pawls (brake pawls) of the freewheel brake shall be addressed in the same way as the freewheel brake below by the reference numeral 112. An ring gear freewheel is designated by numeral 110. Also present but not visible in detail, there is also a planetary gear carrier freewheel that is designated by the reference numeral 109. Introducing a torque into the driver that acts in reverse direction of rotation allows for the possibility of actuating a coaster brake 206 via the freewheel brake 112 and the planetary gear carrier 102a, 102b.

The sun gear couplings are actuated and/or shifted according to FIG. 2 by means of an actuation mechanism that is presently not described in further detail because completely different actuation mechanisms are also possible for use, in principle. The actuation mechanism of the gear hub in FIG. 2 corresponds essentially to the prior art as disclosed in German patent application DE 10 2010 049 438.0 filed on Oct. 23, 2010 and the corresponding Dutch and U.S. applications describing similar constructions. Reference is presently being made to these applications and the content of the disclosure therein is made part of the present application in its entirety.

Figure 3:
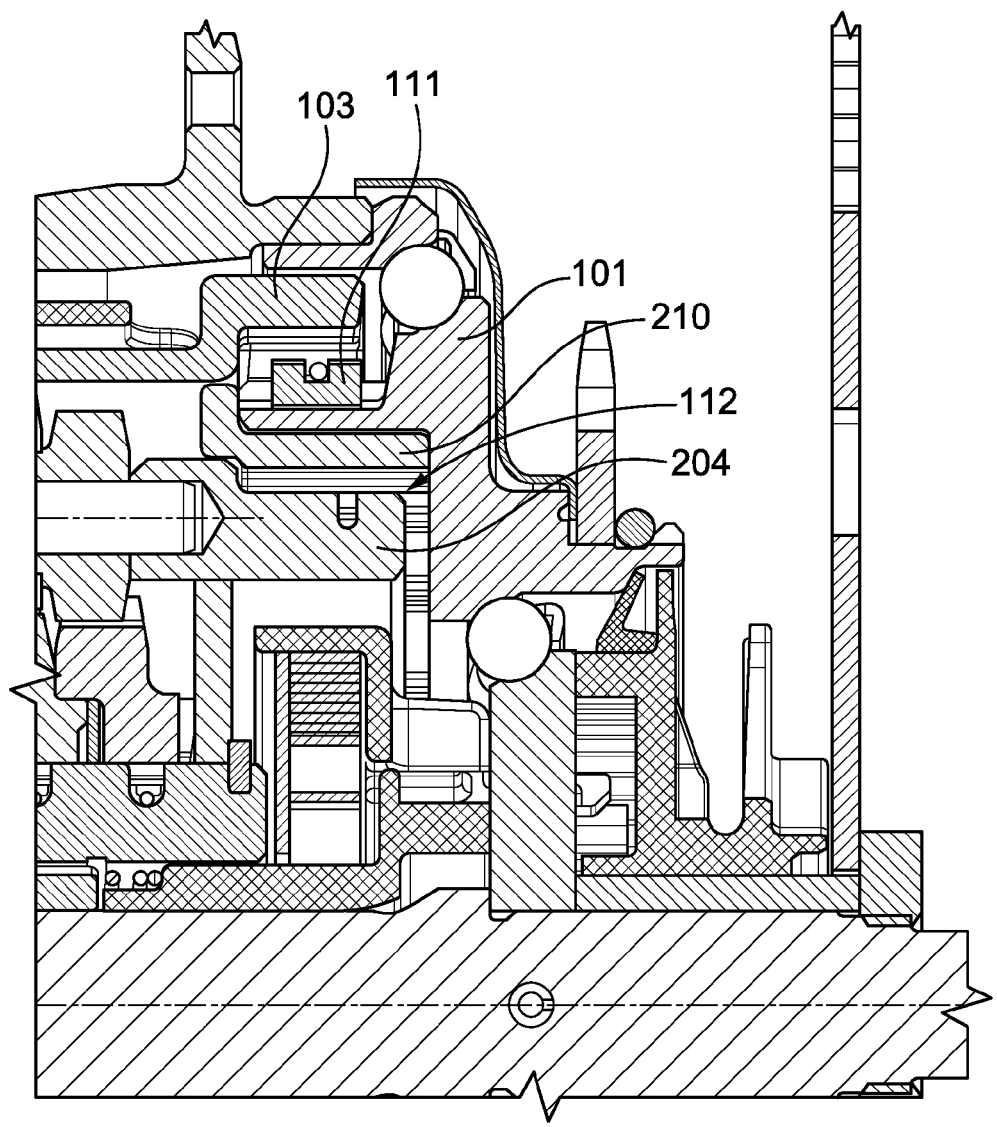
FIG. 3 is an enlarged detail representation of a section of the gear hub of FIG. 2 in which a driver freewheeling clutch is visible between a driver and an ring gear of a first planetary gear level of the multi-speed hub.
Figure 4:
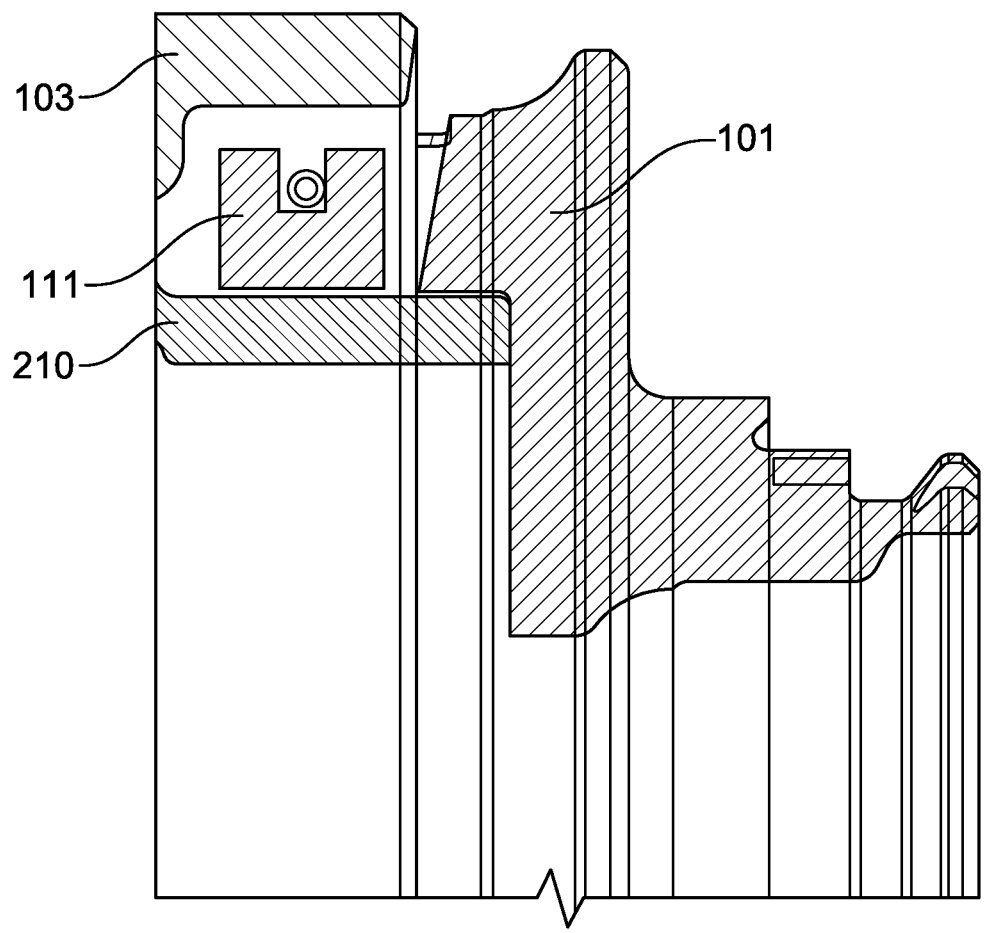
FIG. 4 is a further longitudinal section through the driver, the ring gear and a pawl of the driver freewheeling clutch as well as a ring part that is allocated to the pawl, rotatably supported on the hub axle via the driver and rotatable relative to the driver across an area of an angle of rotation whereby it is possible to influence functionality of the pawl.
Figure 5:
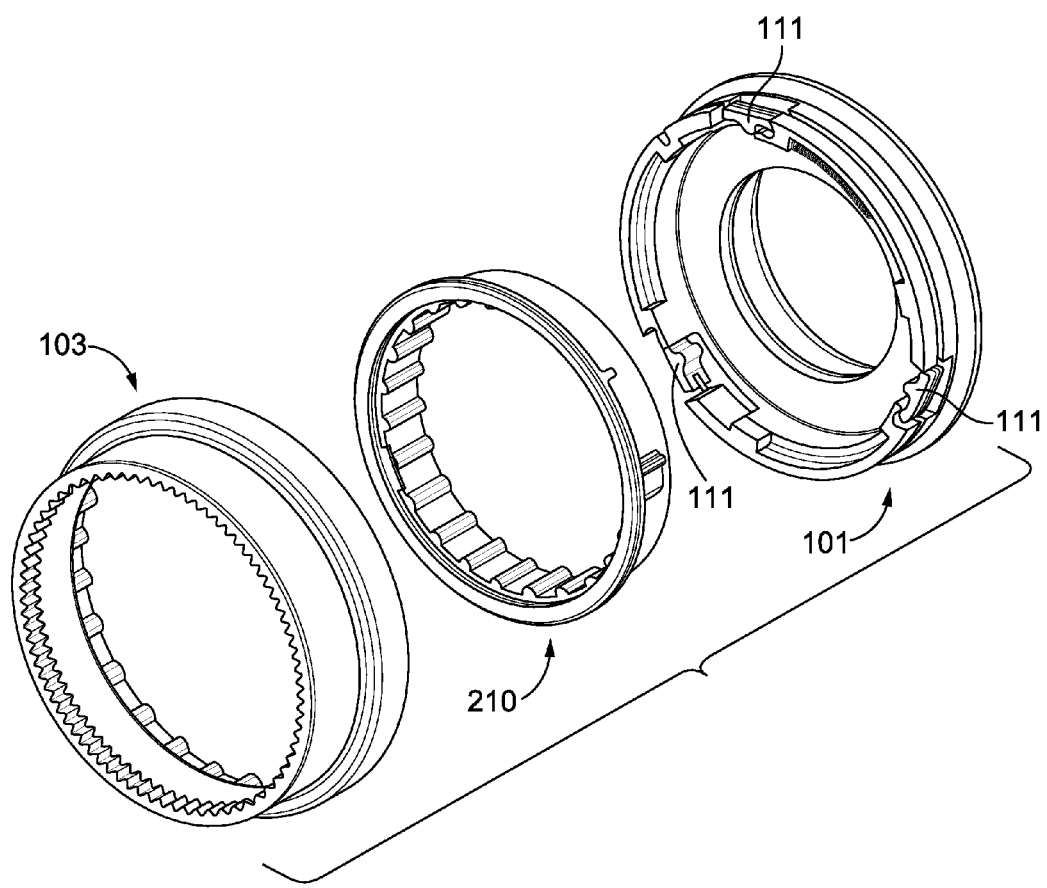
FIG. 5 is a perspective view, by way of an exploded view, of the driver carrying a plurality of pawls, the ring part allocated to the pawls and the ring gear, which can be powered by means of the driver freewheeling clutch comprising the pawls.
Figure 9:
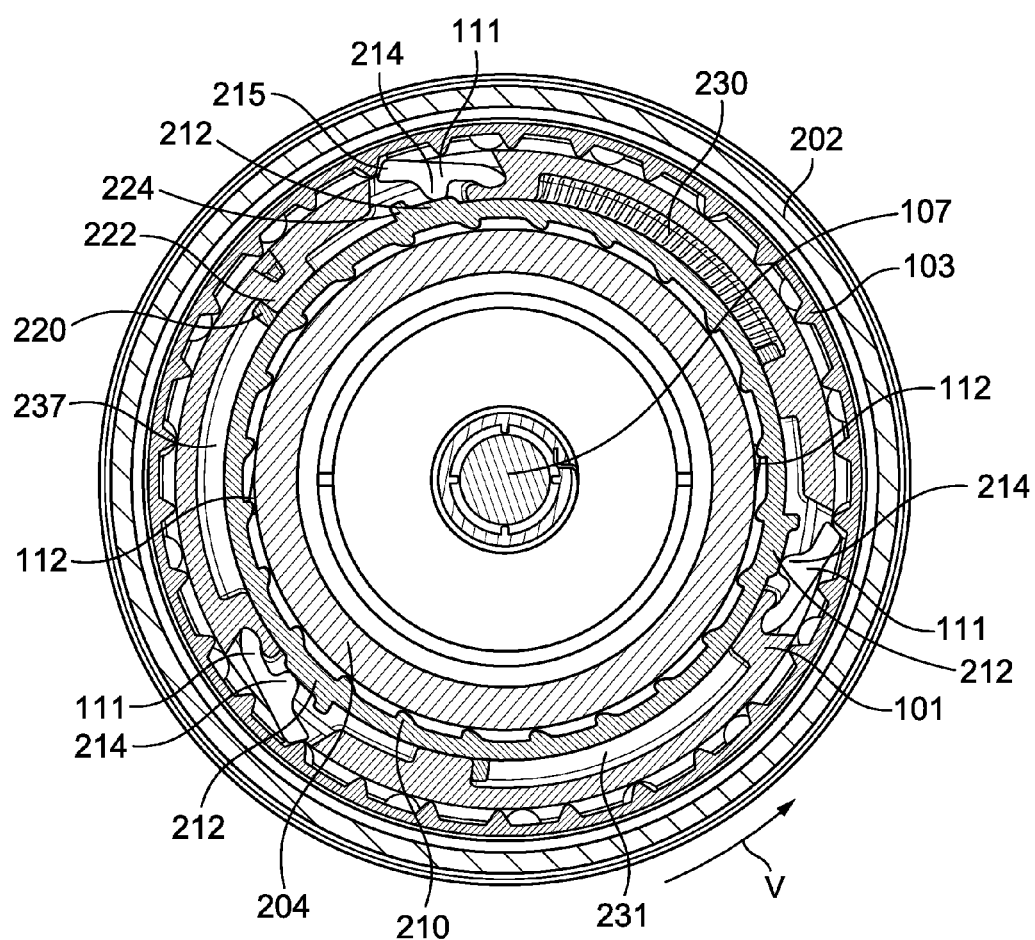
FIG. 9 is an axial sectional view of the totality of the gear hub according to FIG. 8, wherein the pawls of the driver freewheeling clutch are in a different operational state than in the representations according to FIGS. 7 and 8, due to a different position of the ring part.

As can be seen in FIG. 3, a part that is configured a ring part 210 is disposed radially between the planetary gear carrier end portion 204 that supports the brake pawls 112 of the freewheel brake 112, as seen in FIG. 9, and a ring portion of the driver 101 that supports the pawls 111, which includes toothed-type catching formations on an inner circumference (that can also be referred to as engagement formations), which engage with the brake pawls 112 in order to constitute the brake freewheel 112. The brake pawls 112 are biased in a manner known in the art by means of a spring arrangement, constituted, for example, of a ring-type spring, in the direction toward being in an engagement position, whereby the brake pawls are able to engage in the catching formations on the inner circumference of the ring part 210 in order to transmit in the reverse direction of rotation from the driver 101 to the ring part 210 transmitted brake torque to the ring portion 204 of the planetary gear carrier 102a, 102b for forwarding to the coaster brake 206. However, if the driver 101 rotates with the ring part 210 in the forward direction of rotation for transmitting the drive torque via the driver freewheeling clutch 111 to the ring gear 103 and then on via the gear levels to the hub shell 202, the correspondingly designed catching formations act on the internal circumference of the ring part 210 on the brake pawls 112 such that the same are pressed by the respective catching formation against the restoring force of the spring arrangement into an'overdrive position whereby, due to the thus achieved freewheeling function, the driver 101 is able to rotate freely, on the one hand, with the ring part 110 and the ring gear 103 and the planetary gear carriers, on the other hand, are able to rotate around the hub axle 107 at different speeds of rotation, as is commensurate with the instantaneous shifting state of gear level I.

As noted previously, the ring part 210 that is, on the one hand allocated to the drive pawls 111 and constitutes, on the other hand, together with the catch formations thereof and the brake pawls 112 the freewheel brake 112 is able to rotate in conjunction with the driver 101 around the hub axle and supported on the driver 101 in order to achieve this effect. The ring part 210 therein is able to rotate in relation to the driver 101, at least between an activation position, in which the drive pawls 111 act as normal freewheeling pawls that are biased by a pawl spring (for example, a ring spring) or pawl spring arrangement in the direction of their engagement position for interacting with a catch formation on the inner circumference of the ring gear 103 in order to transmit a drive torque from driver 101 to the ring gear 103 acting in the forward direction of rotation and thereby via the gear levels to the hub shell 202, and a deactivation position in which the driver freewheeling clutch 111 is turned off because the drive pawls 111 are removed from their engagement positions and are in a release position in which they do not interact with the catch teeth (i.e., formation) on the inner circumference of the ring gear 103.

According to the representation in FIG. 9, the ring part 210 is in the activation position and the drive pawls 111 are in their engagement positions. It is now possible for torque that is introduced in the driver 101 in the forward direction of rotation by means of the drive pawls 111 and the catch formations of the ring gear 103 to be transmitted to the ring gear and thereby forwarded via the gear levels to the hub shell 202. The drive pawls 111 act as normal freewheeling pawls that would overdrive if the ring gear 103 were to rotate faster than the driver 101 in the forward direction of rotation, or if the driver 101 were to rotate in a reverse direction relative to the ring gear 103, respectively. This functionality is achieved in that in the activation position of the ring part 210, wherein the same can also be referred to as a catch, a radially protruding cam surface hill 212 is located radially below the respective pawl 111 and presses the pawl radially to the outside against a cam follower portion 214 that protrudes radially to the inside. The pawls 111 are pivotable, respectively, around a pivot axis corresponding to the contact area between the cam follower portion 214 and the cam surface hill 212, and they are biased in the direction of being in their engagement position by means of a pawl spring and/or pawl spring arrangement. If the ring gear 103 were to rotate faster than the driver 101, or if the driver 101 were to rotate in reverse direction relative to the ring gear 103, respectively, the drive pawls 111 would be repeatedly radially pressed out of their engagement position by the teeth of the catch formation of the ring gear and off to the inside, in the sense of a pivoting action around a pivot axis that is defined by the contact area between the cam surface hill 212 and the cam follower portion 214, meaning the pawls would execute an overdrive in a manner that is known in the art.

Figure 6:
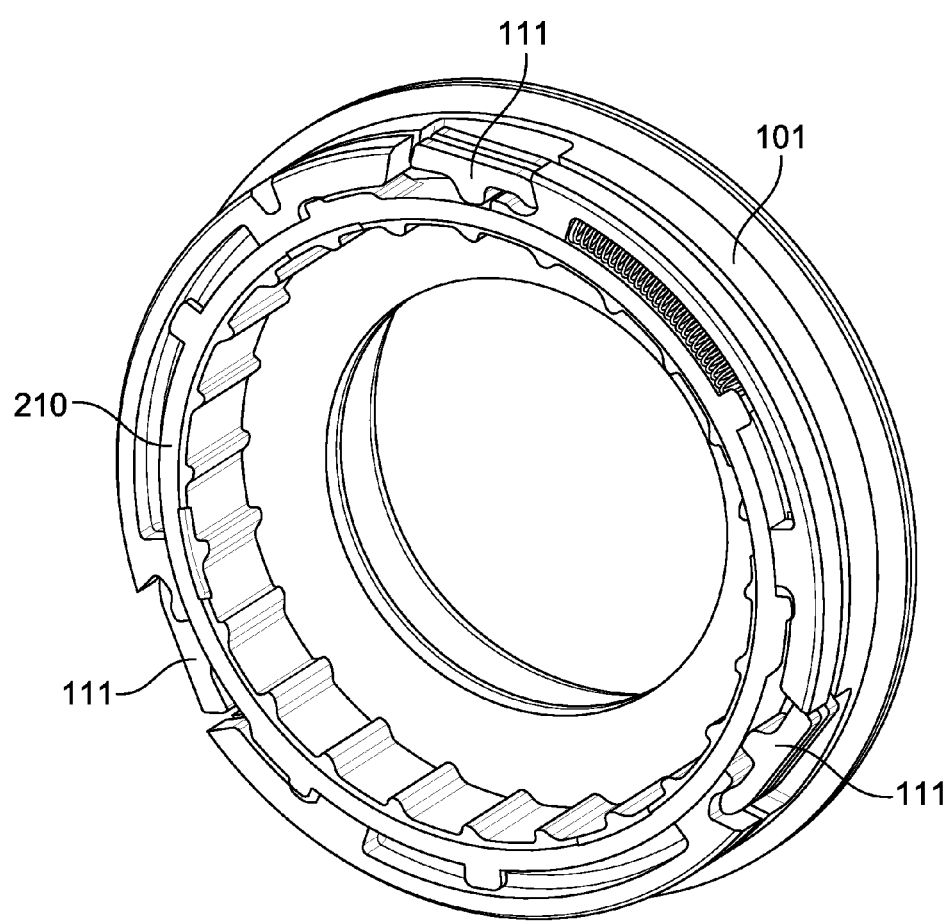
FIG. 6 is the driver carrying the pawls in a state in which the driver is axially combined with the ring part.
Figure 7:
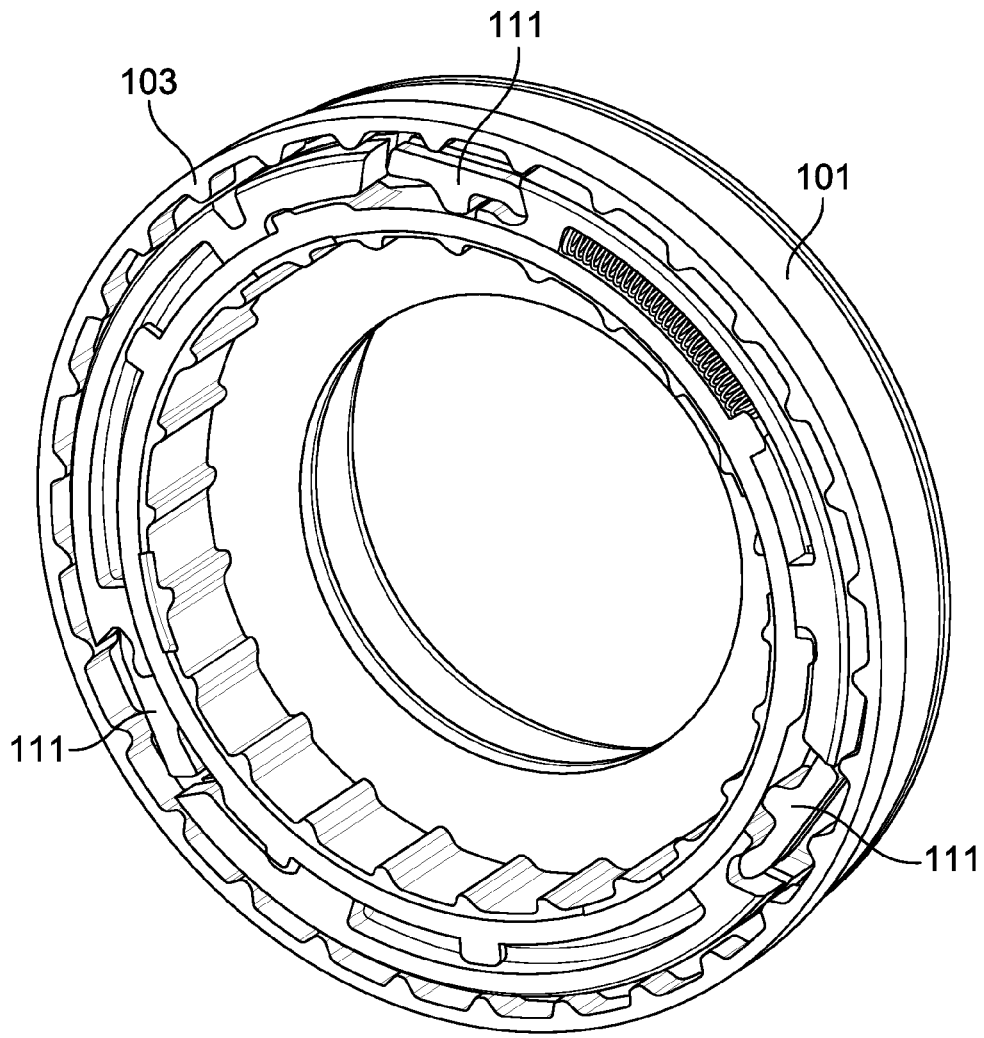
FIG. 7 is the driver carrying the pawls, the ring part and the ring gear, depicted by way of a section, in an axially combined state.
Figure 8:
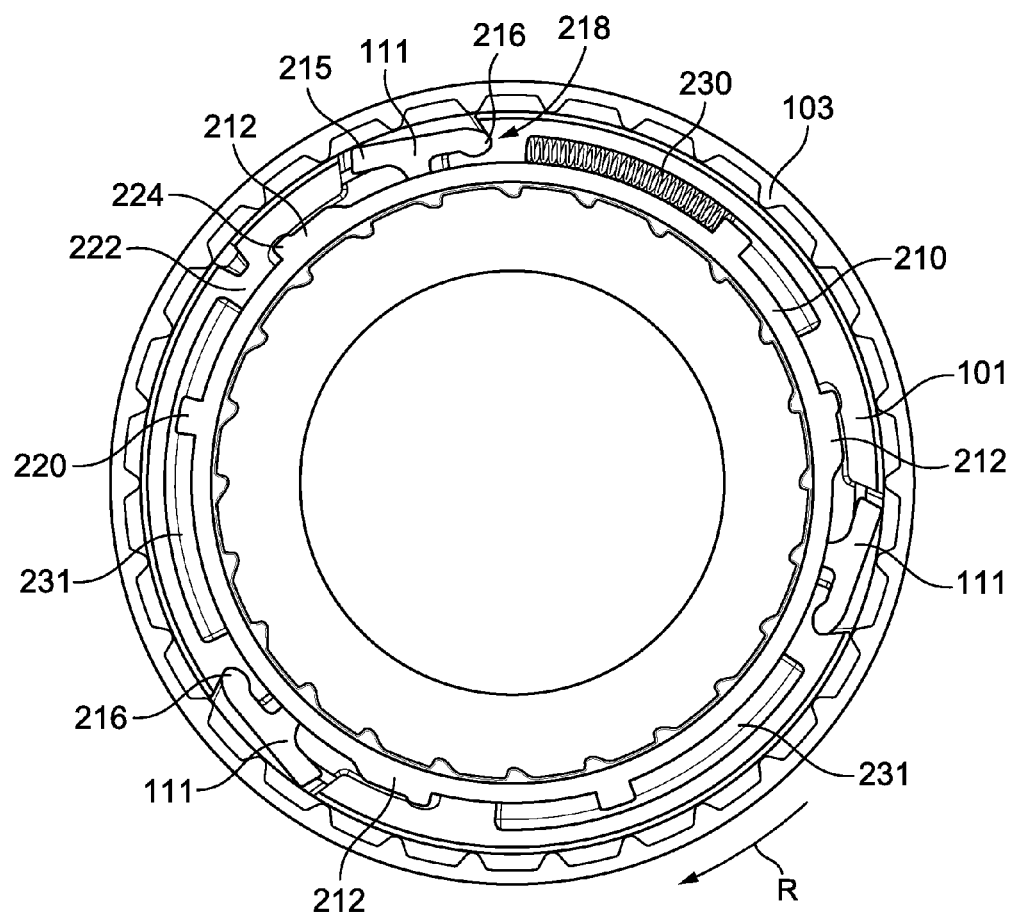
FIG. 8 is an axial view of the components as depicted in FIG. 7 in said axially combined state, wherein the ring gear is depicted by way of a section according to an orthogonal sectional plan relative to the central axis corresponding to the representation in FIG. 7.

On the other hand, if the ring part 210 is in the deactivation position relative to the driver 101, as depicted in FIGS. 6, 7 and 8, the cam surface hill 212 that is allocated to the respective drive pawl 111 is rotated away from the area below the respective pawl 111 such that the pawls 111 are removed from their engagement position due to not being supported on their cam follower portion 214, in that they pivot radially to the inside, around a pivot axis relative to a pawl end that is opposite an engagement end 215 serving for the engagement with the ring gear catch teeth. The pivot axis that is in effect in the deactivation position of the ring part 210 is defined by the contact area between the remote pawl end portion 216 in relation to the engagement end 215 of the respective pawl 111 and a pawl receptacle 218 of the driver 101 that receives the pawl end portion 116.

In the deactivation position of the ring part 210, the pawl spring and/or the pawl spring arrangement acts in a different manner on the drive pawls 111 than in the activation position of the ring part 210, namely in the direction of being in the release position as depicted according to FIGS. 6, 7 and 8 in which the pawls 111 do not radially protrude from the driver 101 and are therefore unable to interact with the catch teeth on the internal circumference of the ring gear 103. The drive pawls 111 achieve this release position alone while under the influence of the biased force of the pawl spring and/or pawl spring arrangement during the changing of the ring part 210 from the activation position into the deactivation position, while the cam surface hill 212 releases the pivot action of the drive pawls 111 around the mentioned pivot axis of the contact area between the pawl end portion 216 and the pawl receptacle 218 in such a manner that it turns away under the cam follower portion 214 and is finally removed from under the cam follower portion 214; or with involvement of an interaction between the pawl engagement end 215 and the catch teeth of the ring gear 103 consequent to an initial rotation of the driver 101 in the reverse direction relative to the ring gear 103 during braking action, wherein the pawls 111 may first execute an overdrive and are only then moved into the release position, should a catch teeth of the ring gear 103 interact first with the pawl engagement end 215, and then the cam surface hill 212 is rotated away below the cam follower portion 214 of the respective drive pawl 211. This aspect will be addressed in further detail below in the context of the comment regarding the envisioned rotary play between the driver 101 and the ring part 210.

It is to be noted, however, that in terms of the function of the drive pawls 111, it would be more correct to speak of a range of an activation-rotary-position and a range of a deactivation-rotary-position regarding the ring part 210 relative to the driver 101 this is because the portion of the cam surface hill 212 that acts upon the cam follower portion 214 has a certain expansion in the circumferential direction, and because the portion of the ring part 210 without cam surface hill, which rotates past under the cam follower section 214, indeed has a comparatively large expansion in the circumferential direction. Expediently, the limit position as depicted in FIG. 9, that provides for a radially protruding stop 220 of the ring part 210 to contact a stop 222 of the driver 101 can be referred to as "activation position" of the ring part 210; and an almost-achieved limit position according to FIGS. 7 to 8, which provides for a stop portion 224 of the cam surface hill 212 of the ring part 210 to make contact on the other side of the stop 222 of the driver 101, can be referred to as the "deactivation position" of the ring part 210, although the pawls 111 are not, in fact, only "activated" or "deactivated," respectively, in these limit position but in the respective relative intervals of the angle of rotation of the possible relative range of the angle of rotation between the ring part 210 and the driver 101.

As represented in FIGS. 6 to 9, a compression spring 230, which is configured as a spiral spring, is disposed, on the one hand, between a support surface of the driver 101 and, on the other hand, a support surface of the ring part 210 that biases the ring part relative to the driver in the direction of being in the deactivation position and ensures, following a braking operation, re-engagement of the drive pawls 111 in that the ring part 210 is rotated back in the activation position if there is no longer a torque acting in the reverse rotating direction introduced in the gear hub.

FIGS. 6 to 9 only depict a single spiral compression spring 230. Preferably, two further spiral compression springs 230 are active between the ring part 210 and the driver 101 at the locations identified by numeral 231 for biasing the ring part 210 in the direction of the stop of the ring part stop 220 on the ring gear stop 222, meaning in the direction of being in the activation position. Normally, the ring part is thus always in the activation position, in which the drive pawls 111 act as normal freewheel pawls. Upon a rotation of the driver 101 in the forward direction of rotation, the ring part 210 is taken along by the mutual stop at 220, 222 forward direction of rotation, wherein the brake pawls overdrive on the pawl support portion 204 of the planetary gear carriers 102a, 102b that rotates at a slower speed in the forward direction of rotation.

The forward rotation of the driver 101 and of the ring gear 103, the forward rotation of the planetary gear carrier 102a, 102b rotating at a slower speed in contrast to the former, and the forward rotation of the hub gear 202 at least at a speed of rotation resulting from the active gear path are counterclockwise in the representations in FIGS. 6 to 9, as indicated by the arrow V in FIG. 9.

The reverse rotation of the driver 101 and of the planetary gear carrier 102a, 102b taken along by the brake pawls 112, as well as the, in contrast, faster reverse rotation of the ring gear 103 during braking operation is, on the other hand, in a clockwise direction in the representations of the mentioned FIGS. 6 to 9, as indicated by the arrow R in FIG. 8. In order to be able transmit for the braking operation brake torque from the driver 101 via the ring part 210, which can be referred to as a catch or catch ring, the brake pawls 212 on the pawl support portion 204 of the planetary gear carrier and thereby via the planetary gear carrier 102a, 102b to the coaster brake 206, the ring part 210 is positively taken along, by a rotary motion by the driver 101, by contact of the driver stop 222 against the ring part stop 224 in the deactivation position of the ring part.

The transition of the ring part 210 from the activation position (FIG. 9) to the deactivation position (FIG. 8) occurs in that the catch teeth on the inner circumference of the ring part 210 engages, upon a beginning reverse rotation of the driver 101 and the resulting beginning reverse rotation of the ring part 210, consequent to forces by the springs 230, with the respective catch tooth on the two brake pawls 112 in the sense of a positive rotary catch in the reverse direction of rotation. This creates, as a result, counter-forces acting upon the ring part 210 that counteract the force of the spring bias of the spiral compression springs 230 and rotate, in the presence of further tension of said spiral compression springs, the ring part 210 from the activation position according to FIG. 9 in the direction of the deactivation position according to FIG. 8 relative to the driver 101. As soon as the stops 224 and 222 make contact with each other, the ring part 210 is positively taken along by the driver 101 in the reverse direction of rotation.

Due to the fact that, during the reverse rotation of the driver, the resulting reverse rotation of the planetary gear carrier results in a faster reverse rotation of the ring gear 103 than of the drivers 101, the rotary play between the driver 101 and the ring part 210, which is implemented by the stop elements 220 and 224 of the ring part 210 acting in conjunction with the driver stop 222, is important in order prevent gear strains or impairment or even impediments to the braking operation. The rotary play is at least as great that, consequent to the contacting of the stops 222 and 224 and following the consumption of the rotary play, the resulting rotary catch of the planetary gear carrier 102a, 102b occurs only when the ring part 210 with the cam surface hill 212 no longer supports the respective cam follower portion 214, and whereby the pawls 111 are released into their release position and for their removal, which is achieved by the pawl spring and/or pawl spring arrangement, if necessary with the involvement of a contact action of a respective catch tooth on the inner circumference of the ring gear, which acts in said state of the pawls in the sense of demonstrating a deflection action regarding the pawls in the direction of the release position thereof. Thus, it is avoided that, on the one hand, the pawls still act as normal freewheel pawls that can transmit torque from the driver 101 to the ring gear 103 in the forward direction of rotation, or correspondingly torque from the ring gear 103 to the driver 101 in the reverse direction of rotation; and, on the other hand, simultaneously, torque is transmitted in the reverse direction of rotation to the planetary gear carrier 102a, 102b with the consequence that a rotation of the ring gear 103 is faster in the reverse direction of rotation than that of the driver 101.

The following functions of the drive pawls are indeed relevant for any operation of the multi-speed gear hub. Upon a forward rotation of the driver 101, typically consequent to a forward pedaling by the bike rider, the drive pawls 111 that are placed in the driver 101 run, with their respective cam follower portion 214, up the respectively allocated cam surface hills 212 of the ring part 210, thereby engaging in the teeth of the hollow gear 103 of the first planetary gear level. This is the normal state during drive operation in the forward direction. With a reverse rotation of the driver 101 for brake operation by means of the coaster brake 206, these drive pawls 111 run down, by their respective cam follower portion 214, the allocated cam surface hills 212 of the ring part 210 and are disengaged before the ring part 210 at the end of the envisioned idle path between the ring part 210 and the driver 101 contacts the same and is rotatably taken along in the reverse direction, as shown in FIG. 9. The planetary gear carrier pawls that are always active (brake pawls) 212, which are over-rolled (overdriven) in the forward direction of rotation, are rotationally taken along in the reverse direction by the internal teeth of the ring part 210, such that the brake function can be realized. To prevent strain on the transmission, allow for brake operation and avoid the risk of so-called "brake lock," the drive pawls 111 drive during the transition from the activation position to the deactivation position, wherein, during a transitional situation, it is also possible to implement the freewheeling function of the drive pawls 111, when the driver 101 rotates in reverse with the pawls 111, but not yet the ring gear 103, until then the cam surface hill 212 is turned away under the respective cam follower portion.

Interacting with the ring part 210, the drive pawls 111 also fulfill an important function for reverse-lifting of the bicycle, because, when pushing the bicycle in reverse, the ring gear 103 also rotates faster than the planetary gear carriers 102a, 102b in the reverse direction of rotation (arrow R in FIG. 8), such that, in the activation position of the ring part 210, the ring gear 103 takes the driver 101 along in the reverse direction of rotation via the drive pawls 111. The catch teeth are then active on the inner circumference of the ring part 210 in the sense of a rotary catch relative to the brake pawls 112. The planetary gear carrier 102a, 102b, however is unable to perform this rotation, whereby the ring part 210 in only able to rotate in reverse, relative to the ring gear and therefore driver 101, at the slower speed of the planetary gear carrier 102a, 102b and/or the pawl carrier, portion 204 thereof, which is why the ring part 210 is rotated relative to the driver in the direction of the deactivation position. The supporting action by the drive pawls 111 on the cam follower portion 214 by the allocated cam surface hill 212 is then cancelled in that the cam surface hill 212 is disengaged from the cam follower section 214, by means of the relative rotating between the driver 101 and the ring part 210 in the direction of the deactivation position. The drive pawls 111 are now pivoted by the pawl spring or pawl spring arrangement, respectively, in their release position, in which they are unable to interact with the catch teeth of the ring gear 103. The interaction of deflection inclines of the ring gear teeth with the engagement ends 215 of the drive pawls 111 can cause the removal of the drive pawls 111 from the engagement position or contribute to the removal of the same.

Correspondingly, even when pushing the bicycle in reverse, any strain on the bicycle transmission is reliably avoided. Due to the spring arrangement that is in effect between the ring part 210 and the driver 101, consequent to the spiral compression springs 230 in the case of the embodiment, the ring part 210 is repeatedly brought in the activation position and again removed from the same during the pushing action in the reverse direction, such that the drive pawls 111 repeatedly come to be in the engagement position during the pushing action in the reverse direction, and are then once again disengaged. The process of removing the engagement pawls 111 from the engagement position and re-engagement of the same as well as the relative rotating that occurs as a consequence therein between the driver 101 and the ring part 210 thus keep recurring, until the bicycle is no longer pushed in the reverse direction.

Regarding the functionality of the drive pawls 111 with regard to the "switch-over" between the two operating modes, reference is made therein in a supplementary manner to the content of EP 2 112 062 A1 that discloses a pawl having two alternate pivot axes and corresponding functionality in a completely different technical context.

In the described embodiment, the drive pawls 111 according to the invention allow for a change-over between the drive action and brake action of the coaster brake hub with reversal of direction of rotation of the driver, as well as a reverse-pushing action of the bicycle without having to be concerned that strain on the transmission may develop or that the so-called "brake lock," which must always absolutely be avoided, may occur. Solutions according to the prior art typically provide for alternately opposite control elements (for the most part two pairs of pawls) that are brought into engagement, wherein the interactive engagement in the event of a reversal of the direction of rotation is achieved by an axial forcible deflection of the drive control elements in an area without any possibility of engagement, or the non-engagement that is necessary for the interactive engagement is achieved by a friction- or force-controlled cover-up of the load-removed drive control elements using a sleeve or the like. The proposed invention allows for a purely rotary mechanism; there are no complex mechanisms for axial deflection and it is thus achieved that the drive pawls reliably dive down during brake action, and the brake pawls are, correspondingly, always available in an uncontrolled manner.

The pawl arrangement according to the invention is also expedient in reliably avoiding transmission strains as well as the so-called "brake lock" during brake operation in the context of other bicycle transmission constructions, when torque most be transmitted via different torque transmission paths in order to power the bicycle or the brakes, respectively.

The invention envisions for a pawl 111 within a bicycle transmission, wherein at least one torque transmission path extends from an input side at driver 101 to an output side at hub shell 202 across the same, and that has allocated thereto, relative to the driver 101 supporting the pawl and a variable/rotatable ring part 210, which interacts with the pawl for the alternate activation and deactivation of the pawl. The ring part 210 includes a cam surface 212 formed thereon, which acts in conjunction with a cam follower portion 214 of the pawl 111 such that when the ring part 210 moves from an activation position to a deactivation position, the cam surface 212 moves relative to the cam follower portion 214 in such a way that the removal of the pawl 111 from an engagement position is allowed and when the ring part 210 moves from the deactivation position to the activation position, the pawl 111 is forcibly moved, due to the interaction of the cam surface 210 and the cam follower portion 214, in order to be in the engagement position or at least to be biased in the direction of being in the engagement position, when the ring part 210 is in the activation position.

While this invention has been described by reference to a particular embodiment, it should be understood that numerous changes could be made within the spirit and scope of the inventive concepts described. Accordingly, it is intended that the invention not be limited to the disclosed embodiment, but that it have the full scope permitted by the language of the following claims.

The invention claimed is:

1. A bicycle transmission, comprising:
an input side by which an input torque from a pedaling operation is introduced into the bicycle transmission, wherein the input torque is one of an input drive torque acting in a drive direction and an input brake torque acting in a brake direction;
an output side through which an output drive torque based on the input drive torque is transmitted to a driven wheel of a bicycle;
a brake mechanism allocated to the output side which is actuated based on the input brake torque to brake the driven wheel;
a gear arrangement comprising at least one planetary gear set providing a plurality of torque transmission paths of different gear ratios between the input side and one of the output side and the brake mechanism;
a drive pawl positioned between a first component and a rotatably supported second component of the bicycle transmission and moves into an engagement position by contacting one of a plurality of catch teeth formed on the second component, and wherein the drive pawl moves out of the engagement position based on the input torque through one of the plurality of torque transmission paths to allow for a relative rotating of the first component and the second component at least in a relative direction of rotation occurring during torque transmission via the one of the plurality of torque transmission paths; and
a third component that interacts with the drive pawl such that in an activation position in relation to the first component, the drive pawl is urged into one of the engagement position or biased in the direction of being in the engagement position, and in a deactivation position the drive pawl is permitted to be removed from the engagement position, through a rotation of the third component relative to the first component;
wherein the third component includes a cam surface that interacts with a cam follower portion of the drive pawl such that, upon a movement by the third component from the activation position into the deactivation position, the cam surface moves in such a manner relative to the cam follower portion that the removal of the drive pawl from the engagement position is permitted, and that, upon a movement by the third component from the deactivation position into the activation position, by interaction of the cam surface with the cam follower portion, the drive pawl is forcibly moved in order to be in one of the engagement position and biased toward the engagement position when the third component is in the activation position.

2. The bicycle transmission according to claim 1, wherein the third component is supported by the first component in order for a joint rotation to occur, and the third component is free to rotate relative to the first component across a delimited area of an angle of rotation.

3. The bicycle transmission of claim 1, wherein the third component is biased in the direction toward the activation position.

4. The bicycle transmission of claim 1, wherein the drive pawl is pivotable around a first pivot axis that is defined by the cam follower portion when the third component is in the activation position, and in the deactivation position the drive pawl is pivotable around a second pivot axis that is defined by a remote pawl portion.

5. The bicycle transmission of claim 4, wherein the drive pawl is pivotable around the second pivot axis when the third component is in the deactivation position, and the drive pawl is pivotable around the first pivot axis when the third component is in the activation position.

6. The bicycle transmission of claim 4, wherein a spring acts upon the drive pawl and pivotally biases the drive pawl in the activation position of the third component around the first pivot axis in the direction of the engagement position and pivotally biases the drive pawl in the deactivation position of the third component around the second pivot axis in the direction of a non-engagement position with the plurality of catch teeth.

7. The bicycle transmission of claim 1, wherein the drive pawl is biased by the third component between a functionality as a freewheeling pawl, which is biased in the direction of being in the engagement position, and a functionality as a biased pawl, which can be shifted to a non-engagement position with the plurality of catch teeth.

8. The bicycle transmission of claim 1, wherein the drive pawl is biased, at least in the deactivation position of the third component, in the direction of being engaged in a release position in which the drive pawl is not engaged with the plurality of catch teeth.

9. The bicycle transmission of claim 1, wherein the drive pawl is biased at least in the activation position of the third component in the direction of being in the engagement position.

10. The bicycle transmission of claim 1, wherein that at least for a certain instantaneous gear state in which the third component is in the activation position, the drive pawl is movable, due to an interaction with the catch teeth, into an overdrive position in which the drive pawl is not engaged with the plurality of catch teeth.

11. The bicycle transmission of claim 1, wherein one of the plurality of torque transmission paths connects the first component with the brake mechanism.

12. The bicycle transmission of claim 11, wherein the third component is movable, based on the input brake torque, between the activation position and the deactivation position, and/or in that the third component is variable, based on an input drive torque that is introduced at the input side, between the deactivation position and the activation position.

13. The bicycle transmission of claim 1, wherein the drive pawl is removable from the engagement position based on a torque from the output side into the bicycle transmission that corresponds to a reverse-pushing operation of the bicycle.

14. The bicycle transmission of claim 13, wherein the third component is movable between the activation position and the deactivation position based on the torque that is introduced at the output side into the bicycle transmission corresponding to the reverse-pushing operation of the bicycle.

15. The bicycle transmission of claim 1, wherein at least in the deactivation position of the third component, an interaction of the drive pawl with the plurality of catch teeth occurs
a) consequent to torque transmission via the one of the plurality of torque transmission paths or/and
b) consequent to introducing a torque that corresponds to a reverse-push operation of the bicycle at the output side into the bicycle transmission upon the drive pawl in the sense of a deflection of the drive pawl from the engagement position.

16. The bicycle transmission of claim 1, wherein at least in the activation position of the third component, the drive pawl is movable into an overdrive position, consequent to torque transmission via a torque transmission path of a second kind based on an interaction with the plurality of catch teeth in which the drive pawl is not engaged with the plurality of catch teeth.

17. The bicycle transmission of claim 1, wherein a torque transmission path of a first kind and/or a torque transmission path of a second kind connects the input side to the output side.

18. The bicycle transmission of claim 1, wherein a torque transmission path of a first kind that connects the input side to the brake mechanism extends across a brake pawl that can be brought in an engagement position for torque transmission between a fourth component of the bicycle transmission, which carries the brake pawl and is rotatably supported, and an allocated, rotatably supported fifth component of the bicycle transmission in order to create a rotary catch connection by engagement with the plurality of catch teeth of the fifth component.

19. The bicycle transmission of claim 18, wherein the brake pawl is biased by a spring arrangement in the direction of being in the engagement position.

20. The bicycle transmission of claim 18, wherein the brake pawl is movable in an overdrive position, consequent to torque transmission that extends across the drive pawl connecting the input side and the output side, due to the interaction with the plurality of catch teeth, in which the drive pawl is not engaged with the plurality of catch teeth.

21. The bicycle transmission of claim 1, wherein the bicycle transmission is configured as a multi-speed gear hub having a first component that is rotatably supported on the hub axle serving as the input side as well as a hub shell rotatably supported on the hub axle that serves as output side.

22. The bicycle transmission of claim 21, wherein a driver is the first component and a gear element of the gear arrangement is the second component.

23. The bicycle transmission of claim 22, wherein a ring gear of the planetary gear set of the gear arrangement is the second component.

24. The bicycle transmission of claim 23, wherein a ring part is the third component and is at least partially radially disposed inside the driver, disposed as rotatably supported on a hub axle by means of the driver, and rotatable relative to the driver at least across an area of an angle of rotation that is delimited by the activation position and the deactivation position.

25. The bicycle transmission of claim 24, wherein at least one compression spring is disposed between a support element of the driver and a support element of the ring part, and biases the ring part relative to the driver in the direction in relation to the activation position that is defined by a stop formed between the driver and the ring part.

26. The bicycle transmission of claim 25, further comprising fourth and fifth components, wherein the ring part is one of the fourth and fifth components, the gear element is the other of the fourth and fifth components, and the ring part is also the third component.

27. The bicycle transmission of claim 26, wherein a planetary gear carrier of the planetary gear set of the gear arrangement is one of the fourth and fifth components.

28. The bicycle transmission of claim 27, wherein a rotary play is implemented between the driver and the ring part such that with a reverse rotation of the driver, the drive pawl is removed from the engagement position consequent to a relative rotating of the ring part in the direction to the deactivation position at the latest upon onset of a reverse rotation of the ring gear.

* * * * *